United States Patent
Arutunian et al.

[15] 3,688,574
[45] Sept. 5, 1972

[54] FLUID FLOWMETER

[72] Inventors: Gregory Arutunian, Detroit; David K. Wilburn, Troy, both of Mich.

[73] Assignee: The United States of America as represented by the Secretary of the Army

[22] Filed: Nov. 2, 1970

[21] Appl. No.: 86,008

[52] U.S. Cl. .............................................. 73/194 E
[51] Int. Cl. .................................................. G01f 3/00
[58] Field of Search .......................... 73/194 E, 194 R

[56] References Cited

UNITED STATES PATENTS

| | | | |
|---|---|---|---|
| 3,403,555 | 10/1968 | Versaci et al. | 73/194 |
| 3,336,803 | 8/1967 | Thorndike | 73/194 |

FOREIGN PATENTS OR APPLICATIONS

| | | | |
|---|---|---|---|
| 1,934,583 | 1/1970 | Germany | 73/194 |

*Primary Examiner*—Richard C. Queisser
*Assistant Examiner*—Herbert Goldstein
*Attorney*—Harry M. Saragovitz, Edward J. Kelly, Herbert Berl and John F. Schmidt

[57] ABSTRACT

Liquid flow rate in a conduit is measured by measuring the time it takes a gas bubble to interrupt two spaced light beams passing through a flowmeter cell. The bubble is introduced upstream of the cell by a fluidic device and passes between a light and a photoelectric cell, which signals an electronic counter. As the bubble passes between a second light and photoelectric cell combination, another signal goes to the counter, which is calibrated to read in whatever units may be desired, such as gallons per minute.

5 Claims, 1 Drawing Figure

PATENTED SEP 5 1972  3,688,574
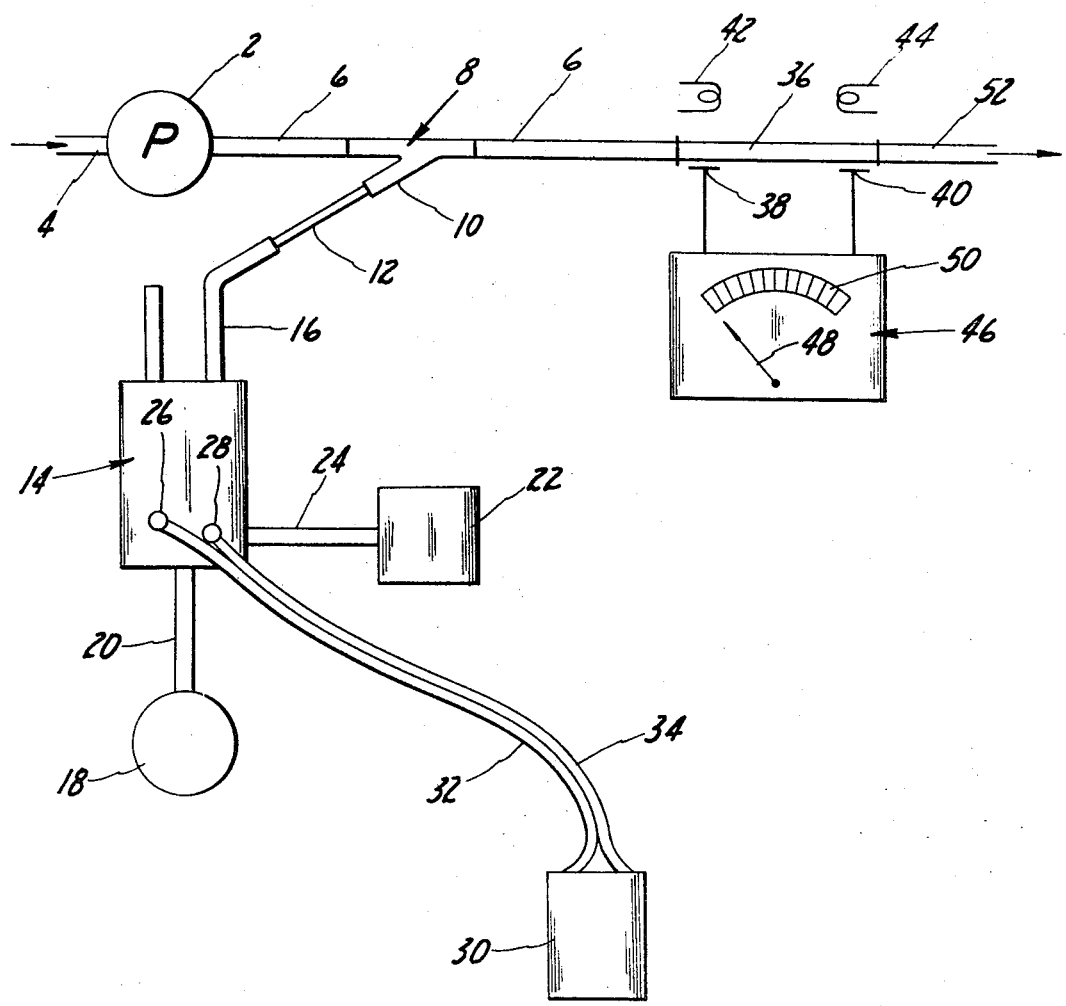
INVENTORS
GREGORY ARUTUNIAN
DAVID K. WILBURN
BY
H.M. Saragovitz    E.J. Kelly
H. Berl    &    John F. Schmidt
ATTORNEYS

FLUID FLOWMETER

The invention described herein may be manufactured, used, and licensed by or for the Government for governmental purposes without payment to us of any royalty thereon.

BACKGROUND OF THE INVENTION

1. Field of the Invention

This invention relates to the measurement of the rate of fluid flow, and especially liquid flow in a closed conduit and having no free surface.

2. The Prior Art

Conventional methods of measuring liquid flow rates involve the rotation of a turbine in a magnetic field to produce an electrical frequency output which is proportional to the flow rate; using an orifice or a venturi, the flow rate being proportional to pressure drop; linear displacement of a ball or a plug in a constant diameter passage; measuring the voltage induced across a conducting liquid flowing through a magnetic field; and measuring the cooling effect of a flowing liquid. Such methods all have disadvantages or difficulties of one kind or another, including high cost, requiring a permanent installation, requiring constant filtration, and the like.

SUMMARY OF THE INVENTION

The conduit carrying the liquid for which the flow rate is to be measured is connected with a flowmeter cell consisting of an elongated section of liquid conduit. Two energy-sensitive means are spaced along the cell to receive radiant energy transmitted through the cell from suitable sources. Upstream of the cell, a Y connection in the conduit is used to introduce a gas bubble into the conduit, by means of an OR-NOR gate, specifically a variable one-shot fluidic multivibrator of which the OR leg is connected with the Y, preferably through a capillary tube, the supply leg is connected with a suitable source of gas under pressure, and the control pressure tap is connected with any suitable source of pulsed fluid pressure such as a NOR fluidic oscillator. An electronic counter is connected to receive the output signals from the spaced light-sensitive means and can be calibrated to read out in any desired units.

It is accordingly an object of this invention to provide a device to give a running reading of the rate of liquid flow in a conduit, which meter can be inexpensively made and is more reliable and more adaptable than conventional meters which accomplish the same or similar objectives.

THE DRAWING

The sole FIGURE of the drawing is a schematic illustration of the preferred combination of elements making up a fluid flowmeter in accordance with this invention.

DETAILED DESCRIPTION

A pump 2 is connected to a source (not shown) of liquid by a conduit 4 and discharges into a conduit 6, and it is the rate of fluid flow in conduit 6 that is to be measured. Conduit 6 includes one input leg and the output leg of a Y shown generally at 8, the other input leg 10 of the Y being connected with a bubble source through a capillary tube 12.

In a preferred embodiment of the invention a stream of bubbles is supplied by means which includes a variable one-shot fluidic multivibrator 14 in which the OR leg 16 is connected to the capillary tube 12 as indicated above. A flowmeter according to this invention has been successfully operated with fluidic element catalog number 190985 Variable One Shot, of the Fluidic Products Dept., Corning Glass Works, Corning, New York 14830. A suitable source of pressure 18 is connected with the supply port of the fluidic device by means of a conduit 20.

A source of control pressure 22 is connected with the control tap of the fluidic device by a conduit 24. Control pressure source 22 can be as simple as a manually operable rubber bulb; such a source gives the operator control over the device and permits the operator to inject one or more bubbles at will. If a continuous stream of bubbles is desired to provide a continuous flow rate reading, a fluidic oscillator may be used as the source of control pressure 22. Other sources of pressure pulses will occur to those skilled in the art and may be used.

Inhibit port 26 and auxiliary port 28 are, in this invention, connected with a capacitor 30 by means of conduits 32 and 34.

Conduit 6 is connected with a flowmeter cell 36. Spaced along cell 36 are a pair of energy-sensitive devices 38 and 40. Radiant energy sources 42 and 44, here shown schematically simply as incandescent light filament loops, are disposed to direct light through cell 36, preferably at right angles to fluid flow, to fall upon the devices which are sensitive to the type of radiant energy used; in the embodiment shown, devices 38 and 40 are suitable conventional photoelectric cells. The output signals from devices 38 and 40 go to a suitable electronic counter 46 which may desirably be provided with an indicator or pointer 48 adapted to cooperate with a scale 50 calibrated in any desired units such as gallons per minute, cubic centimeters per second, or the like.

Liquid leaving cell 36 flows through a connected conduit 52 to a point of use such as the pressure connection of a hydraulic motor, to a reservoir, to a drain to waste, or the like.

OPERATION

A gas bubble enters conduit 6 by way of the Y 8. The velocity gradient forces the bubble to the center of the flow stream where the velocity is a maximum. As the bubble passes between energy source 42 and energy-sensitive device 38, it interrupts the beam of radiant energy and continues through cell 36 to interrupt the beam between source 44 and device 40. The resulting signals from devices 38 and 40 go to counter 46 which provides an instantaneous read-out. Counter 46 actually measures the time elapsed between interruptions of the radiant energy beams falling on devices 38 and 40, but may be calibrated as aforesaid in terms of liquid flow.

Bubble size may be controlled by varying the pressure in source 18, the size of tube 12, the capacitance of the system 30, 32, 34. The Y 8 is preferably far enough upstream of cell 36 to assure that bubble introduction into the liquid stream will not unstabilize the liquid flow.

We wish it to be understood that we do not desire to be limited to the exact details of construction shown and described, for obvious modifications will occur to a person skilled in the art.

What is claimed is:
1. A liquid flowmeter comprising:
   a. a first liquid conduit adapted to be connected with a source of liquid under pressure;
   b. a liquid-conducting (Y) having two input legs and an output leg, one of said input legs connected with said first conduit to receive liquid therefrom;
   c. an elongated cell having a liquid flowpath therethrough and having input and output connections with said flowpath;
   d. a second liquid conduit connecting the output leg of the (Y) with the input connection of the elongated cell;
   e. a source of air bubbles comprising:
      i. a fluidic amplifier having supply, and output ports, and at least one control port;
      ii. a source of air under pressure connected with the supply port of the fluidic amplifier;
      iii. a source of control pressure connected with said control port of the fluidic amplifier;
      iv. a fluid conduit connecting an output port of the fluidic amplifier with the remaining input leg of said (Y); and
   f. means for measuring the time it takes for a gas bubble to pass through the elongated cell.

2. A flowmeter as in claim 1, in which a portion of the fluid conduit connecting the fluidic amplifier with the (Y) is a capillary tube.

3. A flowmeter as in claim 2, in which the control pressure source is a fluidic oscillator.

4. A flowmeter as in claim 1, in which the control pressure source is a fluidic oscillator.

5. A flowmeter as in claim 1, wherein a capacitor is connected with the fluidic amplifier.

* * * * *